United States Patent [19]

Peterson et al.

[11] Patent Number: 4,482,930
[45] Date of Patent: Nov. 13, 1984

[54] ELECTRICAL PROTECTION EQUIPMENT WITH DIGITAL INTEGRATION APPARATUS FOR FIRING PULSE INITIATION

[75] Inventors: Charles A. Peterson, Van Buran Township, Monroe County; Louis C. Grove, Jr., Bloomington, both of Ind.; Robert C. Miller, Penn Hills; Robert M. Oates, Murrysville, both of Pa.

[73] Assignee: Westinghouse Electric Corp., Pittsburgh, Pa.

[21] Appl. No.: 387,715

[22] Filed: Jun. 11, 1982

[51] Int. Cl.$^3$ .................................. H02H 7/16
[52] U.S. Cl. .................................. 361/16; 361/94; 361/96
[58] Field of Search .................... 361/15–17, 361/93, 94, 95, 96, 97, 98; 364/483

[56] References Cited

U.S. PATENT DOCUMENTS

| | | | |
|---|---|---|---|
| 4,174,496 | 11/1979 | McFall et al. | 361/97 X |
| 4,174,529 | 11/1979 | Hamann | 361/16 |
| 4,219,860 | 8/1980 | DePuy | 361/96 X |
| 4,257,004 | 3/1981 | Miller | 324/141 |
| 4,259,704 | 3/1981 | Hamann | 361/16 |
| 4,327,391 | 4/1982 | Grzebielski | 361/96 X |
| 4,379,986 | 4/1983 | Baxter et al. | 361/96 X |

OTHER PUBLICATIONS

IEEE Paper 80 SM 694-0; 1980, by Hamann et al.; pp. 1–9, "A Zinc Oxide Varistor Protective System for Series Capacitors".

Primary Examiner—Patrick R. Salce
Attorney, Agent, or Firm—G. H. Telfer

[57] ABSTRACT

A non-linear resistor assembly protecting equipment such as series capacitors is itself protected by a bypass spark gap, the firing of which is produced by a digitized pulse train, each pulse of which indicates a known increment of energy input to the varistors and is processed by counters and logic gates to achieve an initiating firing pulse upon the occurrence of a predetermined number of pulses indicating the energy input has reached predetermined limits within a given time period. The initial firing pulse is further processed through stages including semiconductor device switching, trigger spark gap firing and energy dumping from an energy storage capacitor into the elements of the main bypass spark gap.

14 Claims, 3 Drawing Figures

ELECTRICAL PROTECTION EQUIPMENT WITH DIGITAL INTEGRATION APPARATUS FOR FIRING PULSE INITIATION

BACKGROUND AND SUMMARY OF THE INVENTION

This invention relates to protection apparatus for electrical equipment and particularly to series capacitors protected by solid state varistors which in turn are to be protected against energy inputs beyond their capability.

Resistors that are highly non-linear, such as metal oxide varistors usually comprising zinc oxide with smaller amounts of other metal oxide constituents, are used to limit the magnitude of voltage across electrical devices that are sometimes subjected to high voltages due to system faults. The varistors, in a permanently connected circuit branch across the protected equipment without any spark gaps in that branch, provide the ability to clip the voltage across the protected equipment to a safe level while keeping the protected equipment connected and in service for its intended function. This is the case with series capacitors used in long AC transmission lines carrying high voltages where the capacitors are directly in series with the transmission line to compensate for inductive reactance and to provide other improvements in electrical characteristics.

Series capacitors are subject to a range of possible overvoltage conditions. The series capacitors themselves can withstand safely a certain level of overvoltage, for example, up to about twice the nominal voltage, referred to as 2 P.U. (per unit). For overvoltages beyond the capability of the capacitors themselves, they need to be protected. Varistors connected in a circuit branch in parallel with the capacitors provide a means for doing so. The varistors can be designed so that at the design limit of the capacitors, say 2 P.U., they start to conduct and effectively remove the excess voltage. This permits the capacitors to remain on the line and to provide all of their intended functions during all portions of the AC cycle in which the voltage does not exceed 2 P.U. In concept, the amount of varistor material used in the assembly can be selected to enable the handling of any contemplated fault condition. Practical limitations often prevent the application of this concept. For example, high fault current conditions may be caused by faults located close to the series capacitor, where the line breakers will isolate the faulted line segment. At the present state of the art, the provision of varistors to handle such large currents would require inordinantly large amounts of varistor material that would be exceedingly expensive. That is because varistors have limits on their energy handling capability above which thermal destruction may result.

To permit a more economical use of varistors in protecting series capacitors, the system can include a bypass device such as a spark gap for their protection at a safe level, such as say, 3 PU of current. Hence, an overcurrent of that amount would result in firing of the bypass spark gap to protect the equipment, but at the same time, effectively remove the capacitors from service for a time. For example, in application Ser. No. 126,094, filed Feb. 29, 1980 by C. A. Peterson, assigned to the present assignee and now abandoned, is described further background on the subject and a means for firing a bypass spark gap under certain conditions. In that patent application, the current through the varistors is sensed to develop a voltage that is then applied through a step-up potential transformer to a trigger spark gap so as to respond to a predetermined voltage level and result in the firing of the principal spark gap bypass. Other systems devised for firing bypass spark gaps around varistors protecting series capacitors are contained in Hamann U.S. Pat. Nos. 4,174,529 and 4,259,704, issued Nov. 13, 1979 and Mar. 31, 1981, respectively. In general, such systems operate in a peak current dependent manner; that is, they can initiate the bypass spark gaps firing upon a given magnitude of current passing through the varistors. When it comes to the time dependent nature of thermal buildup, due to energy input in the varistors, they are relatively less effective. U.S. Pat. No. 4,174,529 contains an approach in which a current sensing device coupled with a combined thermal analog and a low voltage pulse generator circuit generates a low voltage pulse for initiating the operation of a high voltage pulse generator to trigger an air gap device bypassing the varistors. The thermal analog circuit of the patent consists of a resistor-capacitor charging circuit in which the discharge time constant of the RC circuit is relied on for approximating thermal recovery of the varistor. This does so only in a crude way. RC circuits are suitable for thermal analogs for only short time periods because it would be difficult to devise a capacitor whose discharge rate reliably approximated the thermal recovery of varistors over an extended time such as about 30 minutes or more.

The present invention obviates the difficulties and deficiencies of the prior art apparatus by utilizing digital integration apparatus for initiating a firing signal for the bypass spark gap and, preferably, utilizing the initial firing signal in an improved gap firing system that reliably ensures that the initial firing signal, though of relatively low voltage, will rapidly result in the firing of the spark gap. The digital integration apparatus, in brief, and its method of operation, involve the development of a pulse train, for example, a series of digital "one" signals, from the monitored varistor current in which each pulse occurs when a voltage directly related to the sensed current is integrated over time to produce a small predetermined increment, Vdt. The digital pulse train is producible at such a high rate, such as in excess of 10,000 pulses per second, that it offers wide flexibility in its use as a time dependent measure of energy in the varistors. Firing signals can be generated upon the occurrence of any of a multiplicity of different conditions. Some of these conditions may, for example, relate to relatively short time events in which a number of pulses within periods down to the millisecond level can be reliably counted and if they reach a threshold can promptly initiate the firing signal. The same pulse train can be applied to each of a number of counter sets that are timed for different conditions. In addition, thermal analoging is unnecessary by digitizing the energy input so that no analog devices such as long time constant capacitors are required. Yet, the ability to simulate the exponential cooling rate of the varistors over substantial periods of time such as about 30 minutes or more is provided.

The pulses of the pulse train for these various functions can be counted by any number of counters which are in turn individually reset according to prescribed time intervals. In addition, for thermal digitizing, a counter of the type shown in digital signal processing as an up/down counter is provided with the pulse train, to increase the count in the counter, while also being provided with inputs from a time regulated signal source, such as a crystal oscillator and timing module in conjunction with a binary rate multiplier or another device providing the same function, to decrease the count in a manner accurately related to the cooling rate of the varistors so that the stored count at any instant in the up/down counter represents the energy storage of the varistors.

What is achieved by these techniques is greatly increased versatility and reliability of the firing system so that as a consequence, for a given quantity of varistors, say sufficient to handle 2 PU without risk of harm, the initiation of a firing pulse for the bypass spark gap can be safely delayed, in order to keep the capacitors in service, until conditions truly require their removal while at the same time permitting a recognition of a build-up of energy under high fault conditions where there is a rapid rate of rise of current so that even without approaching the limit of the varistor's capability, the gap will fire. This latter function is of significance so that upon firing of the gap, the system may be restored to operation as rapidly as possible. To do so, one would wish that the varistors not have been subjected to as high energy input as they may be capable of sustaining because such conditions result in heating which would require a further time for dissipation before permitting the operation of the system. Consequently, the system provides reliable operation under a variety of short and long time conditions.

Additional features of the improved system have to do with the means and manner in which the spark gap is fired after the initial firing signal is produced by the digital system. The presently preferred arrangement includes a solid state switching device such as a thyristor which normally blocks the conduction in a primary winding of a transformer. In the secondary winding of that transformer is a trigger spark gap which can be highly precise to rapidly fire upon the initiation of conduction in the primary. An energy storage system receives power from a power supply that is in operation at all times the transmission line is energized and comprises an energy storage capacitor that is in a circuit branch including the trigger spark gap and part of the main gap firing system. The latter includes a resistor connected across two electrodes of a three electrode spark gap. The voltage built up across this resistor upon the firing of the trigger gap and the release of energy of the energy storage capacitor is sufficient to break down that spark gap and result in a cascading effect, where multiple spark gaps are used, particularly in conjunction with a cascading capacitor system for total conduction of the bypass parallel to the varistors. The system is normally provided with additional components as will be described hereinafter, such as a bypass breaker in another parallel branch which may be manually operated or may be responsive to current conduction through the spark gap bypass to close and provide a further conduction path.

DESCRIPTION OF PREFERRED EMBODIMENTS

Figure 1:
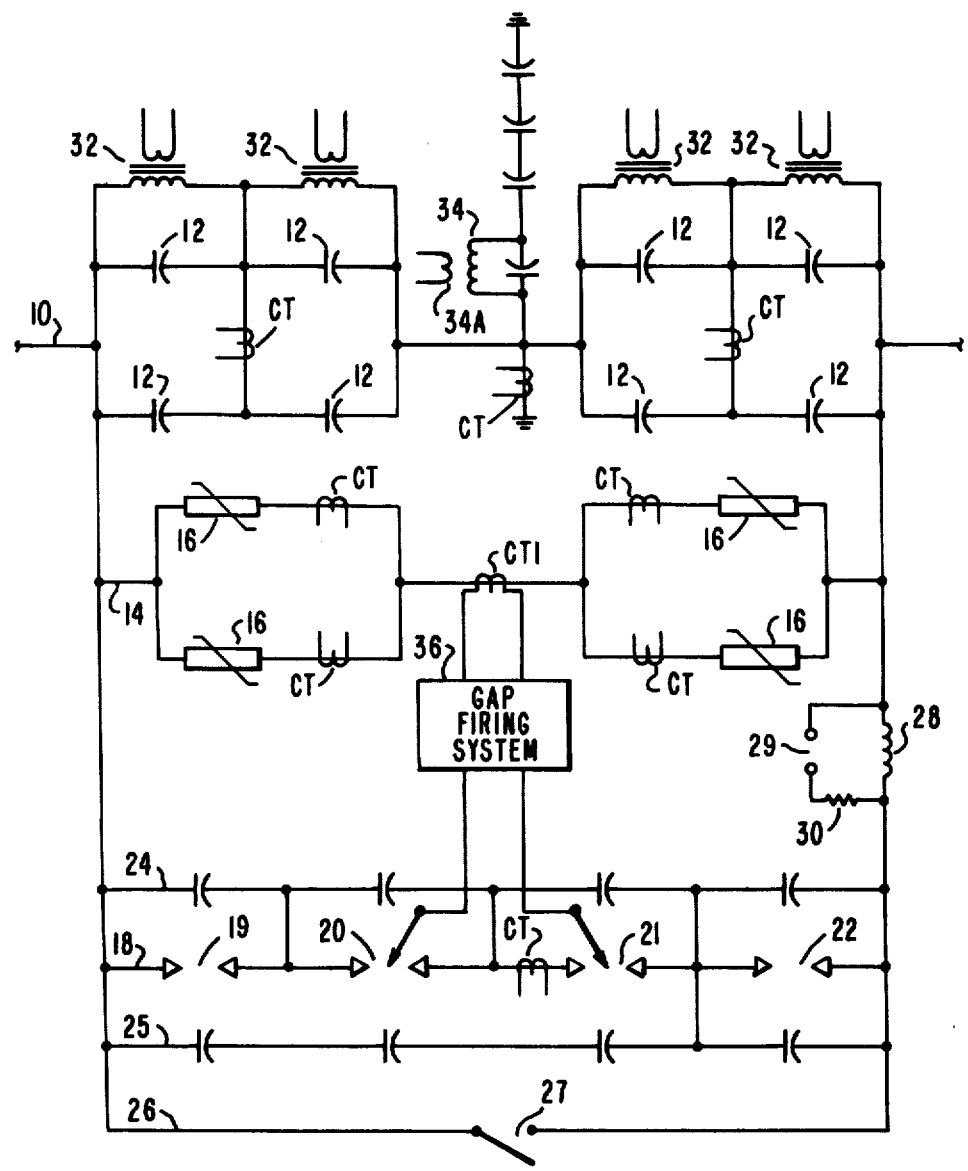
FIG. 1 is a general circuit schematic of a series capacitor system to serve as an example of the application of the present invention.

While the utility of the invention is not limited to series capacitor systems, it will be described in that context. FIG. 1 illustrates a typical series capacitor segment and equipment associated therewith. The system is associated with a transmission line 10 that may extend for many miles from a generator to various points of distribution. The series capacitor segment shown may be but one of several located in the transmission line. Each of the capacitors 12 shown within the upper portion of the drawing is representative of the grouping of capacitors in a series-parallel configuration to provide the desired capacitive reactance and individual capacitor units may be much more numerous than those shown.

There are several circuit branches in parallel with the branch or branches containing the series capacitors. These include a non-linear resistor circuit branch 14 containing several and perhaps more numerous individual varistor units 16 connected in some series-parallel configuration of which that shown is representative. The varistors 16 are solid state elements with a strongly voltage dependent conduction characteristic so that they can maintain a safe maximum limit on voltage applied to the series capacitors 12 by conducting upon any overvoltage of a given magnitude.

A further parallel circuit branch 18 includes a number of spark gaps 19, 20, 21 and 22 and is the main bypass for the series capacitors 12 and varistors 16 in instances when the voltage level may be in excess of that to which the varistors can be safely subjected because of the thermal effects of the current that would be conducted through them. The spark gap branch 18 may include one or more spark gaps in series with each other. In the system illustrated, two of the spark gaps 20 and 21 are of the three electrode type having an electrode extending between the two main electrodes that are actually in the circuit branch 18 itself. The third electrodes are referred to as triggering electrodes as they are used to facilitate the initiation of conduction between the main electrodes. The power spark gaps may, for example, each be in accordance with the teachings of Riggins U.S. Pat. No. 4,277,719, July 7, 1981, with the three electrode spark gaps configured substantially the same as the two electrode spark gaps except that they have a third trigger electrode extending through and spaced from the upper electrode of the structure.

Two strings of cascading capacitors 24 and 25 are connected to the spark gap branch 18 as shown by way of example and have the function of further facilitating the breakdown of the series of spark gaps upon the initiation of conduction of any one of the spark gaps.

In a further circuit branch 26 is a bypass breaker 27 which is essentially a mechanical switch for the purpose of closing a circuit around the other elements in the event of any need for maintenance on those elements. It can also be made to operate automatically upon the occurrence of a given magnitude of current through the spark gap branch 18.

A damping reactor 28 with a parallel spark gap 29 and resistor 30 combination is depicted as representative of that normally used for limiting current to the main spark gaps.

Further, the illustrated apparatus includes by way of general illustration a plurality of power transformers 32 whose primary windings are connected across various individual groups of the series capacitors 12 and whose secondary windings may be connected as power supplies to any of a variety of different equipment, some of which will be discussed hereinafter. They are representative of means for developing power for the local needs of the platform. A capacitive voltage transformer 34 is also shown which is a means for providing a level of voltage of relative precision to enable performance of certain instrumentation functions or other power supply functions.

At various locations in the illustrated system segment are shown the windings of current transformers CT that may be used for various types of monitoring and control functions. These include, of particular importance in the understanding of the present invention, a current transformer CT1 whose primary winding is conducting the total current through the varistor branch 14. The secondary winding of current transformer CT1 is connected with an energy monitoring and spark gap firing system 36, to be further described hereinafter, which is shown connected with the trigger electrodes of the three electrode spark gaps 20 and 21 in the bypass branch 18.

Figure 2:
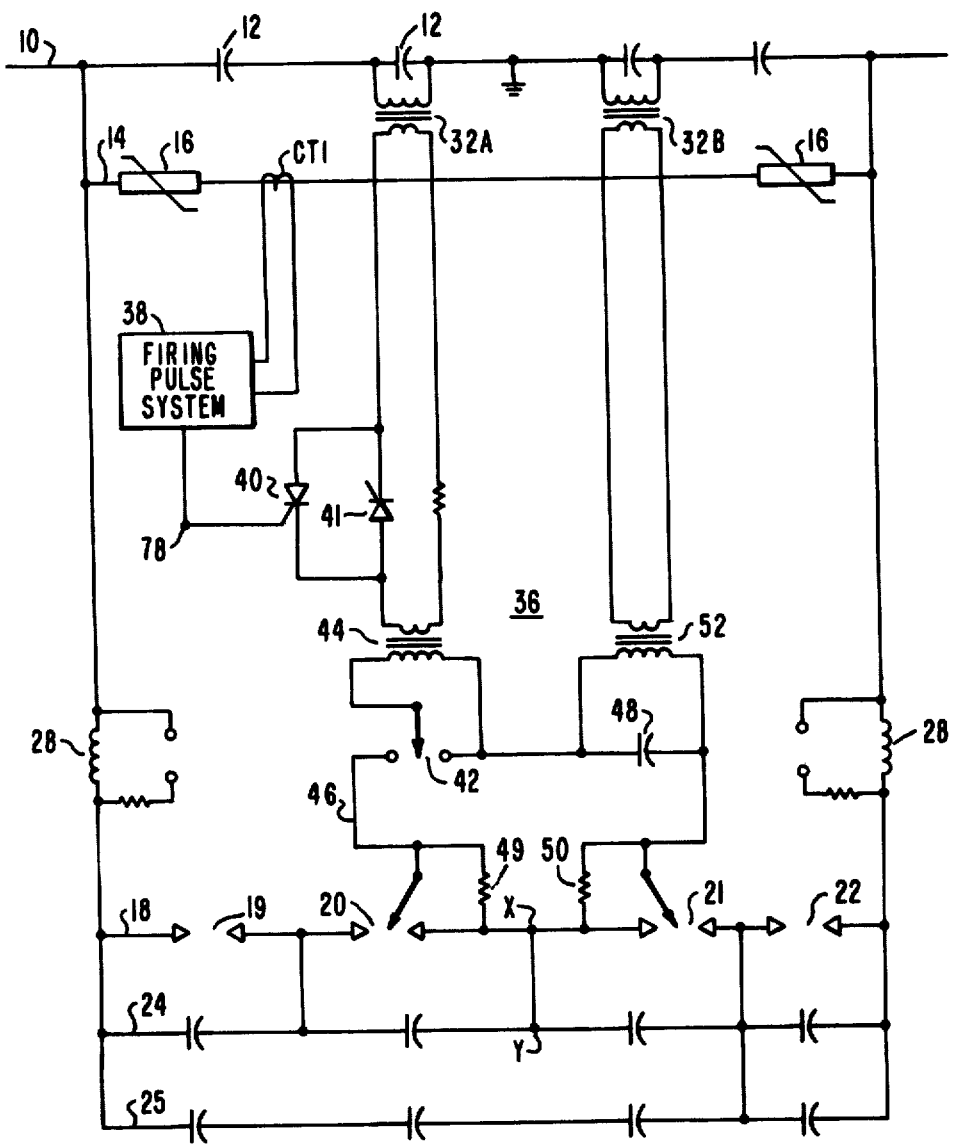
FIG. 2 is a further schematic diagram illustrating an embodiment of the present invention; and, FIG. 3 is a schematic circuit diagram of an embodiment of an energy firing pulse system for firing signal initiation that may be used in the system depicted in FIG. 2.

In FIG. 2, the same or a substantially similar system is shown as that in FIG. 1 but with a fuller showing of elements of the energy monitoring and gap firing system 36. This illustrates the manner and means of rapidly firing the spark gap bypass 18 whenever the varistor conditions so prescribe in a plurality of successive stages to ensure precision and the adequate accounting for different power levels in the system. In this example, an initial firing signal is produced by an energy monitoring and firing signal system 38 connected as shown between the current transformer CT1 on the varistor branch 14 and the gate of a thyristor 40. Once a firing signal is produced by the initiating apparatus 38 and the thyristor 40 is fired, subsequent action takes place to fire a high precision trigger spark gap 42 which in turn stimulates the prompt occurrence of the firing of at least one of the gaps in the main spark gap system 18 which then cascades to full conduction. The thyristor 40 shown connected to the energy monitoring and digitizing system 38 is connected in inverse parallel configuration with a second thyristor 41 which may also be connected with the system 38. The power supply for the thyristors utilizes one of the platform power transformers 32A of the capacitor segment with the secondary winding of 32A connected in series with the thyristors 40 and 41. That winding circuit is also the primary winding circuit of an isolation transformer 44 whose secondary winding is connected to one of the principal electrodes and to the trigger electrode of the trigger spark gap 42. As indicated by the turns ratio, this would be a step up potential transformer so the thyristor's firing will provide abundant voltage for the breakdown of the trigger gap 42.

The main electrodes of the trigger gap 42 are in a circuit loop 46 including an energy storage capacitor 48, trigger electrodes of the three electrode main spark gaps 20 and 21 and resistors 49 and 50 connected from those trigger electrodes to main electrodes of those spark gaps. The energy storage capacitor 48 is in a circuit related through the two transformer 32B and 52 as shown to the power line 10 so that, independent of any operation of the switching components, it is charged up continually to hold a significant energy level that is only released into the circuit loop 46 when the trigger spark gap 42 fires. Upon that event, a significant voltage develops across the resistors 49 and 50 associated with the trigger spark gaps 20 and 21. When either of these two triggered spark gaps 20 and 21 fires, the trigger portion of the other three electrode gap will have the entire voltage of the storage capacitor across it and will spark over. The cascading capacitors in branches 24 and 25 will cause all gaps to spark over whenever the three electrode gaps 20 and 21 are fired. The cascading capacitor ratings are such that when the three electrode gaps are fired increasing PU voltages are applied to the remaining gaps forcing them to spark over. For purposes of example, the gaps are set to at least 3.5 PU, for example, for initial firing. Relatively high settings, above 2 PU, for the firing of the gaps 19, 20, 21 and 22 assure gap voltage recovery in less than a second after fault clearing. The overvoltage applied to gaps 19 and 22, respectively, is about 6 PU and 8 PU after the sparkover of gaps 20 and 21. All four gaps 19, 20, 21 and 22 will continue to conduct until the line breakers clear the fault causing the overvoltage or until the capacitor bypass breaker closes due to excess conduction time.

Other specific schemes may be employed to fire the triggered gaps 20 and 21. One way which requires less stored energy in capacitor 48 and thus can be satisfied by using a smaller capacitor 48 has the series combination of gap 42 and capacitor 48 connected directly, without appreciable impedance, to a point X in branch 18 intermediate the gaps 20 and 21 and to a point Y intermediate the two middle capacitors in branch 24. Those two points would not be directly connected as shown but instead would have a resistor therebetween. The trigger electrodes for gaps 20 and 21 could be connected, through respective resisters, to point Y. This arrangement causes more effective firing of gaps 20 and 21 under most conditions.

Figure 3:
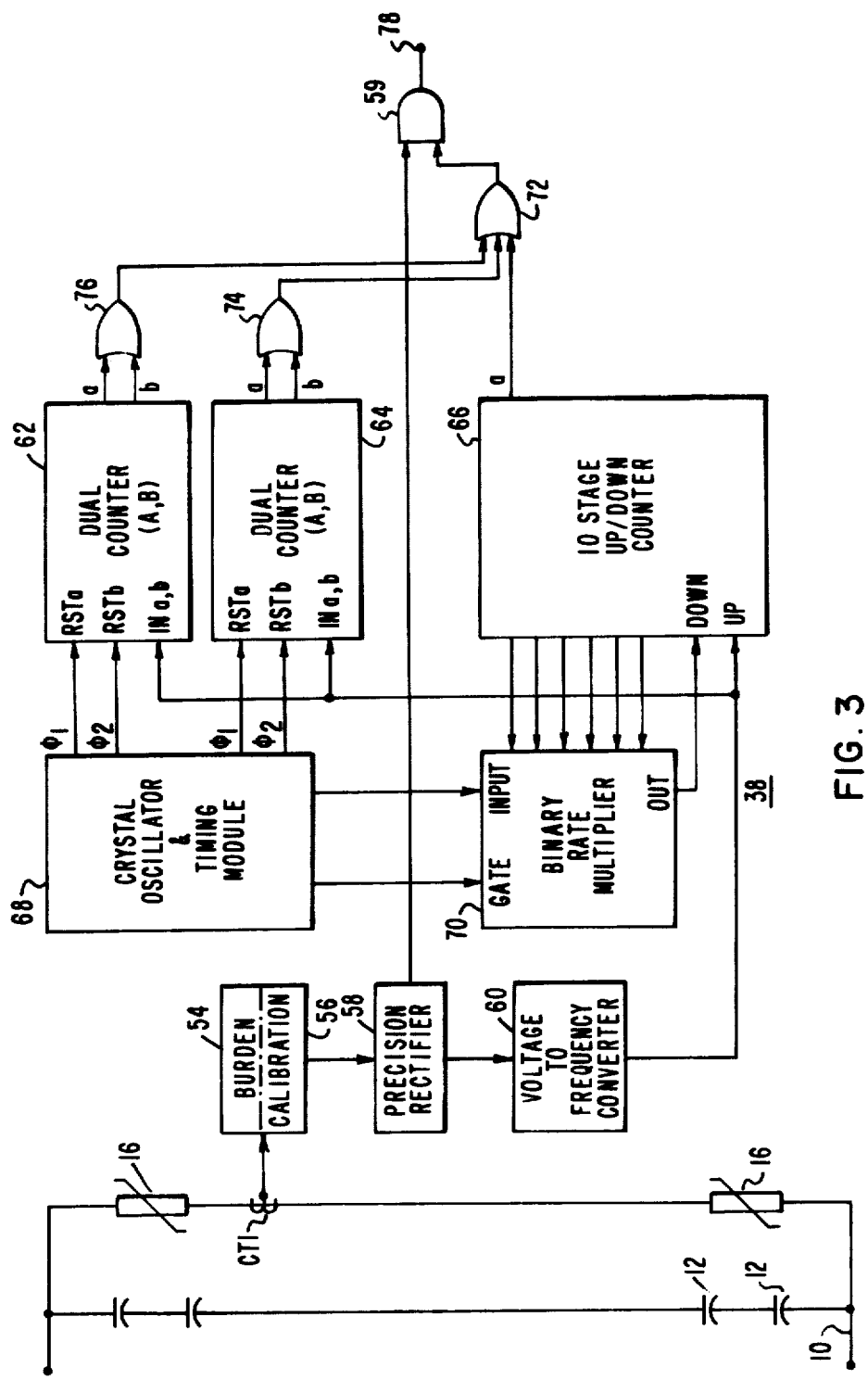

An important feature of the system is the energy monitoring and digitized firing pulse control system 38, an example of which is shown in FIG. 3. This type of system can be readily devised to meet a variety of system conditions all of which have generally to do with the rate of energy input into a bank of non-linear resistors such as zinc oxide varistors 16 and to provide an electrical firing signal that is then used in the apparatus further shown in FIG. 2 to result in spark gap firing whenever the energy input is such that it reaches or approaches the rating of the non-linear resistors. For example, the non-linear resistors may be subject to a set of conditions such as the following: (1) the energy input during any two millisecond period should not exceed four megajoules; (2) the energy input during any fifty millisecond period should not exceed six megajoules; and (3) the energy input over a period of time, allowing for an exponential thermal cooling rate with a time constant of 32 minutes, should not exceed 14.4 megajoules. The time constant is the period for decay from a first energy level to a level of 1/e (or about ⅓) of the first level. These conditions are determined by various factors among which is the total energy input that the non-linear resistors can sustain without thermal damage under worst case conditions which assumes the existence of a maximum ambient temperature.

It would in some instances be beneficial, as opposed to no energy monitoring at all, to have such monitoring of total energy input such as (3) above, as the sole criterion for determining the firing of the spark gap system. This case will take care of thermal monitoring to avoid damage to the varistors from either high or low current faults. However, there are reasons for prescribing the additional sets of conditions (1) and (2) that have to do with energy input within short periods of time. This is because such energy inputs within those short periods of time indicate that the fault is of relatively large magnitude and that, although the varistors may be able to tolerate increasing quantities of energy at the same rate for an additional period of time beyond it is beneficial for overall system performance to curtail the operation before reaching the thermal limit. If the spark gap is only fired upon reaching the thermal limit after a large in-rush, it will take a subsequent relatively long period before it returns sufficiently close to ambient temperature to enable reinsertion without being subject to a further spark-over event within a short time upon even a minor fault. That is, if the system recognizes that the nature of a fault occuring is such that it is most likely to reach the thermal limit, it is generally preferable for the system to bypass the varistors as soon as possible rather than delaying. The variety of conditions presented here by way of example are therefore such as to account for various possible effects on the varistors. It is to be noted that a varistor element will not necessarily heat up evenly when absorbing energy. If a small time increment is permitted in which the temperature may equalize, a second energy input may become more tolerable.

With these various conditions in mind that are to be satisfied, the apparatus of FIG. 3 will be described particularly to show an exemplary specific embodiment of the energy monitoring and digitized firing pulse control system 38 of the invention. A current transformer CT1 is disposed on the circuit branch 14 containing the non-linear resistors 16 to continually sense the current flowing therethrough and provides a reliable signal on its secondary winding representing the magnitude of energy input by direct proportionality. A burden 54 which may be a resistor or some combination of resistors or other suitable electronic circuit is supplied the signal from the current transformer to produce an electrical output voltage that is proportional to the instantaneous value of the current flowing through the non-linear resistors. As a typical example, the current transformer CT1 and its burden 54 may be chosen so that the voltage output would vary between ±10 volts magnitude when the maximum possible current is flowing through the non-linear resistors. The maximum possible current referred to being that which is predetermined to be that resulting from the worst sort of fault to which the system may be subjected such as one resulting in a fault current of 4.5 PU, for example. The burden 54 may include or have as an additional element connected with it a calibration block 56 which may be an adjustable resistor in order to adjust manually the magnitude of the voltage swings of the output of the burden.

A precision rectifier 58 receives this signal and subjects it to full wave rectification. A precision rectifier is preferred because, besides performing the normal rectification functions, it compensates for the inherent voltage drop of rectifier elements which may, to a slight degree at least, modify the waveform. The resulting output from the precision rectifier is an unfiltered full wave rectified signal whose cusps very closely match the zero crossing points of the line waveform. This signal is supplied to a voltage to frequency converter 60 as well as to an AND gate 59. The operation of the voltage to frequency converter 60 is such that an output pulse is generated every time the integral of the input voltage with respect to time increases by some small fixed predetermined increment. Suitable voltage to frequency converters are commercially available; a suitable example is a Burr Brown VFC-32. The voltage to frequency converter is the digitizing element of the system which converts the analog signal which is proportional to the energy input into a series of digital pulses, that is, pulses of uniform magnitude of very short duration. The occurrence of the pulses is dependent upon the rate at which the energy input occurs. The train of pulses is supplied, in this system as an example, to three different sets of counters 62, 64 and 66, the general functioning of which is to count the number of pulses in the pulse train occurring in some time interval and multiplying by an appropriate constant the time integral of the input voltage over the chosen time interval. Thus, the time integral of the input voltage over the chosen time interval can be determined. Typically, the unit would be adjusted to produce pulses at a rate such as 200,000 per second when the maximum current is flowing through the non-linear resistors. An oscillator and timing module 68 would consist of, for example, a crystal controlled oscillator clock and appropriate dividers to provide timing pulses as required for functioning of the various counters. The counters 62, 64 and 66 would each be used to detect one of the three conditions referred to above. Upon the occurrence of any of these prescribed conditions, an output pulse would be generated and applied to the second input of the AND gate 59.

A ten stage up/down counter 66 and a binary rate multiplier 70 serve to detect condition (3) relating to the thermal limit of the non-linear resistors. For this purpose, the output of the voltage to frequency converter 60 is connected to the "up" input of the counter. Thus, the total number of counts, which is represented as a binary number, is proportional to the integral of current over time and hence to the total energy input to the non-linear resistors since the voltage across the non-linear resistors is essentially constant. The condition that the voltage is essentially constant results from the fact that the non-linear resistors have a predetermined breakover point at which high conduction takes place without any appreciable change in voltage. The required exponential decay of this quantity due to cooling is provided by the binary rate multiplier 70. The operation of the rate multiplier is determined by a binary number inputted into the device (as indicated by the six arrows from the up/down counter in this example), clock pulses provided at the input, such as at a 1 KHz. rate, and a gating signal at the gate terminal. At each occurrence of the gating signal, such as once each two minutes, a number of pulses will be generated which is equal to the binary number inputted into the multiplier. The output of this device is connected to the "down" input of the up/down counter 66. Since the binary rate multiplier is connected to the six most significant bits of the ten bit up/down counter, the number of pulses which will be generated in any one operation will be 1/16 of the number stored in the up/down counter. These pulses will be subtracted from the number stored in the up/down counter as a result of inputs from the voltage to frequency converter and, the number stored in the counter will be decremented by 1/16 at each operation. The time constant $\tau$ of the exponential decay so generated is related to the time between operations t by the equation:

$$e^{-t/\tau} = 1 - D$$

$$t/\tau = D$$

where D is the decrement per operation and t is the period of the gating signal. Thus, for D=1/16 and t=2 minutes, a time constant of 32 minutes would result. As the circuit is shown, there would always be a bias of 16 counts in the counter, after initial startup reaches 16 counts, which is essentially of no effect since as will be shown later, the trip signal will be generated when there are 800 to 1,000 counts in the counter, a much larger number. In those cases where such a bias would be considered important, the circuit could be provided with a timed pulse source to generate one additional pulse to the binary rate multiplier at each operation.

The total count as represented by the binary number stored in the counter 66 at any instant is proportional to the total power input to the non-linear resistor reduced by exponential decay in close relation to the thermal cooling rate of the non-linear resistors. When this number exceeds a preset number determined by the rating of the non-linear resistors, a group of AND gates included within the counter 66 would generate an output pulse and supply it to OR gate 72.

The other conditions (1) and (2) prescribed above are sensed by the additional digital counters 62 and 64 which could each be single counters that are reset at the appropriate intervals in a fairly straightforward manner. However, because of the possibility of resetting one of these counters during a fault and thus giving a false reading, it is preferred to use dual counters in each case for additional precision and accuracy although multiple counters greater than two could also be used for even greater accuracy. The operation of these are identical except for the control times.

A dual counter consists of two counters which are reset at equal intervals but not coincidentally. In the case of the counter 62 determining the existence of condition (1), there would be resetting of each counter in the dual set after a two millisecond period but counter A of the set is reset halfway between the resetting of counter B. The described operation is by way of example, it would not be necessary that the resetting operations occur exactly intermediate those of the second half of the dual counter. If a serious fault would occur while counter A is being reset, counter B would sense the total energy. Whenever the number in either counter A or B exceeds the preset number corresponding to the non-linear resistor rating, a group of AND gates will produce output signals to OR gate 72.

The timing signals are such that counters in dual counter 62 are reset at least every two milliseconds and those in dual counter 64 every 0.433 seconds which corresponds to 26 cycles at the line frequency and is close to the above-prescribed fifty millisecond time interval.

The outputs of the three counters 62, 64 and 66 are connected through OR gates 72, 74, and 76 and an AND gate 59 to the firing circuit at terminal 78 which is connected to the gate of thyristor 40 in FIG. 2. The second input terminal of the AND gate 59 is connected to the output of the precision rectifier 58 so that an ouput signal will only be generated when current is flowing through the non-linear resistors and thus there will be sufficient voltage to ensure successful firing of the bypass system.

If, for example, the worst fault which might occur produces a maximum current of 20,000 amperes and at that time the voltage across the non-linear resistors 16 would be 150 kV, the maximum rate of energy input to the resistors would be 3,000 megajoules per second. Under these conditions, it is suitable for CT1, burden 54, and voltage to frequency converter 60 to be adjusted to produce pulses at a rate of 200,000 per second. The number of counts in each of the counters 62, 64, 66 would correspond to the three trip conditions as given in the following Table;

| Condition | Max. Energy Input | Count Rate | Counts to Produce Firing Signal |
|---|---|---|---|
| (1) | 4 MJ. in 2 ms. | 133,333/sec. | 267 |
| (2) | 6 MJ. in 5 ms. | 80,000/sec. | 400 |
| (3) | 14.4 MJ. net* | — | 960 |

*Corresponds to a maximum temperature of the varistor elements.

The system as described is very versatile and other functions or firing conditions could be incorporated as required. For example, total energy at which the firing signal could be generated is dependent on the ambient temperature. Thus, by sensing the ambient temperature directly rather than taking an assumed maximum ambient temperatures predetermined condition, and appropriately adjusting the count in counter 66 at which a firing signal is generated the increased capacity of the non-linear resistor on cold days could be utilized.

The power supply requirements for the energy monitoring and digital processing system 38 can be readily satisfied from the power line 10. For example, referring to FIG. 1, the capacitive voltage transformer 34 output winding 34A can be supplied to a circuit (not shown) comprising a rectifier, battery charger, and battery from which D.C. voltages are derived for various portions of the system 38. In so doing, with a battery system, counter readings are saved even though the power line 10 may be off for a time and the system 38 is fully operational upon repowering of the line (when varistors 16 may have retained heat from prior operation).

The system 38 of FIG. 3 is exemplary of one manner in which pulses representing varistor energy input can be processed to satisfy a given set of conditions. The description given will be understood to permit implementation by known digital signal processing techniques. Both the specific conditions to be satisfied and the specific manner of digital signal processing may be varied within the general teachings described herein. For example, the binary rate multiplier may, as a matter of designer's choice, be replaced by a decimal rate multiplier. In addition, the digital processing system (62, 64, 66, 68 and 70) may be implemented using a programmable general purpose microprocessor. Also, a commercial voltage to frequency converter, such as that mentioned above, would preferably be used with a voltage comparator that is connected to permit the converter's operation only when the voltage applied by rectifier 58 is above a given level. That is because a commercial V/F converter alone is usually subject to aberrant operation at very low voltage levels that may result in an output pulse when the requite Vdt has in fact not occurred. In the same vein, the system may contain other refinements for precision and redundancies for reliability as are required to meet a desired level of performance over a long life. In addition, various fault simulators and function testers can be built in with appropriate readouts to confirm performance capability without necessarily causing an actual firing of the system.

The embodiment of the apparatus described may be further modified to shift the character of the protective function from that of bypassing the protected element, the varistor assembly, to opening the circuit of the protected element by having the firing signal result in turning off a switch in branch 14, for example.

We claim:

1. Electrical protection equipment comprising:
    means for monitoring current through a protected element;
    means for developing, from said means for monitoring current, a pulse train in which a pulse occurs upon each input of a given increment of energy to said protected element;
    first counter means having said pulse train supplied thereto for producing a first distinctive output upon the accumulation of a given pulse count within a given time that represents a predetermined energy input to said protected element,
    second counter means for receiving said pulse train and decrementing from said pulse train in a time regulated manner representing the thermal cooling rate of said protected element so the pulse count at a given instant represents the difference between the energy input to said protected element from the current therethrough and its thermal cooling, a second distinctive output being produced upon a given net pulse count;
    firing pulse means for producing a firing pulse upon the occurrence of any of said first and second distinctive outputs from said counter means and the flow of current through said element to be protected; and,
    means, responsive to said firing pulse, for terminating current conduction through said protected element.

2. Electrical protection equipment in accordance with claim 1 wherein:
    said first counter means comprises a dual set of counter elements which count pulses of said pulse train over given periods of time of the same duration but displaced from each other by a fraction of said same duration and said first distinctive output is produced when either one of said dual set of counter elements reaches said given pulse count within one of said given periods of time.

3. Electrical protection equipment in accordance with claim 1 wherein:
    said means for terminating current conduction through said protected element comprises spark gap means contained within a circuit path bypassing said protected element; and
    a trigger spark gap is connected in series with an energy storage means and arranged to breakdown as a result of said firing pulse, the conduction of said trigger spark gap resulting in energy stored in said energy storage means impressing a voltage on said spark gap means sufficient to cause said spark gap means to break down.

4. Electrical protection equipment in accordance with claim 1 wherein:
    said second counter means comprises a multiple stage up/down counter having a first input receiving said pulse train and a second input receiving pulses from a time regulated decrementing means indicative of the thermal cooling rate of said protected element; and,
    said first counter means comprises a dual set of counter elements which count pulses of said pulse train over given periods of time of the same duration but displaced from each other by a fraction of said same duration and said first distinctive output is produced when either one of said dual set of counter elements reaches said given pulse count within one of said given periods of time.

5. Electrical protection equipment in accordance with claim 1 wherein:
    said second counter means comprises a multiple stage up/down counter having a first input receiving said pulse train and a second input receiving pulses from a clock regulated binary rate multiplier indicative of the thermal cooling rate;
    said means for terminating conduction through said protected element comprises spark gap means contained within a circuit path bypassing said protected element;
    energy storage means for storing energy developed by a first power supply;
    a trigger spark gap in series with said energy storage means and arranged to breakdown upon the operation of said switch means providing power from a second power supply to said trigger spark gap and the resulting conduction of said trigger spark gap results in energy stored in said energy storage means impressing a voltage on said spark gap means sufficient to cause said spark gap means to break down.

6. Electrical protection equipment in accordance with claim 1 wherein:
    said first counter means comprises a dual set of counter elements which count pulses of said pulse train over given periods of time of the same duration but displaced from each other by a fraction of said same duration and said first distinctive output is produced when either one of said dual set of counter elements reaches said given pulse count within one of said given periods of time;
    said means for terminating conduction through said protected element comprises spark gap means contained within a circuit path bypassing said protected element;
    energy storage means for storing energy developed by a first power supply prior to operation of said switch means;
    a trigger spark gap in series with said energy storage means and arranged to breakdown upon the operation of said switch means providing power from a second power supply to said trigger spark gap and the resulting conduction of said trigger spark gap results in energy stored in said energy storage means impressing a voltage on said spark gap means sufficient to cause said spark gap means to break down.

7. Electrical protection equipment in accordance with claim 1 wherein:
    said second counter means comprises a multiple stage up/down counter having a first input receiving said pulse train and a second input receiving pulses from a time regulated decrementing means indicative of the thermal cooling rate;
    said first counter means comprises a dual set of counter elements which count pulses of said pulse train over given periods of time of the same duration but displaced from each other by a fraction of said same duration and said first distinctive output is produced when either one of said dual set of counter elements reaches said given pulse count within one of said given periods of time;

said means for terminating current conduction comprises spark gap means contained within a circuit path bypassing said protected element;

energy storage means for storing energy developed by a first power supply prior to operation of said switch means;

a trigger spark gap in series with said energy storage means and arranged to breakdown upon the operation of said switch means providing power from a second power supply to said trigger spark gap and the resulting conduction of said trigger spark gap results in energy stored in said energy storage means impressing a voltage on said spark gap means sufficient to cause said spark gap means to break down.

8. A series capacitor system comprising:

a series capacitor assembly for connection in a transmission line;

a solid state varistor assembly connected in parallel with said series capacitor assembly in a continuously conductive circuit branch, said varistor assembly having high conductivity upon a given voltage magnitude being applied thereto, which is a magnitude against which said series capacitor assembly is to be protected, and also having a time dependent energy input limit;

spark gap means connected in parallel with said series capacitor assembly and said varistor assembly;

firing means for causing said spark gap means to conduct when the energy input limit of said varistor assembly is approached;

said firing means comprising means for producing a series of pulses whose rate is proportional to energy input to said varistor assembly and means for processing said series of pulses including counting pulses within given periods of time to produce a firing signal upon said varistor assembly approaching its energy input limit which promptly results in conduction of said spark gap means.

9. A series capacitor system in accordance with claim 8 wherein:

said means for processing said series of pulses comprises a multiple stage up/down counter having a first input receiving said pulse train and a second input receiving pulses from a time regulated decrementing means indicative of the thermal cooling rate so the total cumulative pulse count of said first counter at a given instant represents the difference therebetween;

said means for processing said series of pulses also comprises a dual set of counter elements which count pulses of said pulse train over given periods of time of the same duration but displaced from each other by a fraction of said same duration and a distinctive output is produced when either one of said dual set of counter elements reaches said total cumulative pulse count within one of said given periods of time.

10. A series capacitor system in accordance with claim 8 wherein:

said firing means further comprises spark gap means contained within a circuit path bypassing said protected element;

energy storage means for storing energy developed by a first power supply prior to operation of said switch means;

a trigger spark gap in series with said energy storage means and arranged to breakdown upon the operation of said switch means providing power from a second power supply to said trigger spark gap and the resulting conduction of said trigger spark gap results in energy stored in said energy storage means impressing a voltage on said spark gap means sufficient to cause said spark gap means to break down.

11. A series capacitor system in accordance with claim 8 wherein:

said means for processing said series of pulses comprises a multiple stage up/down counter having a first input receiving said pulse train and a second input receiving pulses from a clock regulated binary rate multiplier indicative of the thermal cooling rate so the total cumulative pulse count of said first counter at a given instant represents the difference therebetween;

said means for processing said series of pulses also comprises a dual set of counter elements which count pulses of said pulse train over given periods of time of the same duration but displaced from each other by a fraction of said same duration and a distinctive output is produced when either one of said dual set of counter elements reaches said total cumulative pulse count within one of said given periods of time;

said firing means further comprises spark gap means contained within a circuit path bypassing said protected element;

energy storage means for storing energy developed by a first power supply prior to operation of said switch means;

a trigger spark gap in series with said energy storage means and arranged to breakdown upon the operation of said switch means providing power from a second power supply to said trigger spark gap and the resulting conduction of said trigger spark gap results in energy stored in said energy storage means impressing a voltage on said spark gap means sufficient to cause said spark gap means to break down.

12. A method of operating a series capacitor system for maximizing service with reliable protection comprising:

providing a series capacitor assembly in a transmission line with a varistor assembly connected in a parallel bypass branch where the varistor assembly has sufficient bulk to handle safely the energy resulting from a first magnitude of fault conditions primarily occurring remote from said series capacitor assembly and the varistor assembly has less than sufficient bulk to handle safely the energy resulting from a second magnitude of fault conditions primarily occurring close to said series capacitor assembly;

monitoring, on a continuing basis while the series capacitor assembly and varistor assembly are connected with the transmission line, the energy input to said varistor assembly to provide a first continuous signal proportional thereto;

converting said first continuous signal to a series of pulses by digital integration whereby each pulse indicates a given quantum of energy having been supplied to said varistor assembly and the rate at which said pulses are produced indicates the rate at which energy is being supplied to said varistor assembly;

supplying said series of pulses to one or more sets of digital counters that are related to timing means for counting the occurrence of pulses within a given period of time; and producing a firing signal for bypassing the varistor assembly when the number of pulses within a given period of time indicates the varistor assembly is conducting current and is approaching the limit of its energy handling capability.

13. A method of operating a series capacitor system in accordance with claim 12 further comprising:

supplying said firing signal to a solid state switch for energizing a trigger spark gap that releases energy from an energy storage system that fires a spark gap assembly in a bypass connected with the transmission line in parallel with the varistor assembly.

14. A series capacitor system comprising:

a series capacitor assembly for connection in a transmission line;

a solid state varistor assembly connected in parallel with said series capacitor assembly in a continuously conductive circuit branch, said varistor assembly having high conductivity upon a given voltage magnitude being applied thereto, which is a magnitude against which said series capacitor assembly is to be protected, and also having a time dependent energy input limit;

spark gap means connected in parallel with said series capacitor assembly and said varistor assembly;

firing means for causing said spark gap means to conduct upon a given net energy in said varistor assembly;

said firing means comprising means for producing a series of pulses whose rate is proportional to energy input to said varistor assembly and means for processing said series of pulses and decrementing from said pulse train in a time regulated manner representing the thermal cooling rate of said protected element so the net pulse count at a given instant represents the net energy difference between the energy input to said protected element from the current therethrough and its thermal cooling.

* * * * *